Oct. 24, 1967     R. H. BROWN ETAL     3,348,426
FLEXIBLE CUTTER SHAFT FOR CUTTING SLOTS IN A SOLID
PROPELLANT IN A ROCKET MOTOR CASE

Filed Aug. 19, 1964     3 Sheets-Sheet 1

Robert H. Brown INVENTORS
Alfred H. Hecht

BY

ATTORNEY

Robert H. Brown INVENTORS
Alfred H. Hecht

ATTORNEY

Oct. 24, 1967 R. H. BROWN ETAL 3,348,426
FLEXIBLE CUTTER SHAFT FOR CUTTING SLOTS IN A SOLID
PROPELLANT IN A ROCKET MOTOR CASE
Filed Aug. 19, 1964 3 Sheets-Sheet 3

Robert H. Brown
Alfred H. Hecht INVENTORS

BY

ATTORNEY

United States Patent Office 3,348,426
Patented Oct. 24, 1967

3,348,426
FLEXIBLE CUTTER SHAFT FOR CUTTING SLOTS IN A SOLID PROPELLANT IN A ROCKET MOTOR CASE
Robert H. Brown and Alfred H. Hecht, Huntsville, Ala., assignors to Thiokol Chemical Corporation, Bristol, Pa., a corporation of Delaware
Filed Aug. 19, 1964, Ser. No. 390,710
3 Claims. (Cl. 74—501)

This invention relates to improvements in flexible cutter shafts that are to be used to cut slots in a solid propellant that has been incorporated into a motor case for a solid propellant rocket motor.

It is a well-known fact that the propulsion of solid propellant rocket motors is created by a physical mass or body of solid propellant that is often referred to as in the grain.

The shape, size, exposed burning surface and geometrical form of the grain influence the burning characteristics of the rocket and largely determine the operating pressure, thrust and duration of the flight of the rocket.

If a large thrust is desired, this can be achieved by a large burning surface which can be achieved in one way by varying the exposed surface of the geometrical shape of the cavity that is created in the grain.

In the early development of solid propellant rocket motors, it was possible to create the cavities in the grain by the use of a one-piece rigid core or mandrel which could be inserted into and withdrawn from the aft end of the motor case for the rocket motor without creating or causing any defects in the exposed surface of the cavity. However, as new requirements for changes in the geometrical configuration of the cavity were made, it became almost impossible to create such configurations with a one-piece core or mandrel.

Some of the changes in the form of the cavity required that slots be provided in the grain that extended transversely of the longitudinal axis of the motor case and communicated with a central cavity that had been created in the grain.

Many solutions were presented to meet this problem, and the means that were provided to create such slots were commonly called slot formers.

The slot formers suggested and, in many instances, used included slot formers that could be destroyed and removed from the grain without damaging the exposed surface of the slot. Other slot formers were made in sections that could be removed section by section from the slot.

These structures were necessitated because the slot was always of a greater diameter than the central cavity in the grain; and thus with the slot former encompassing a configuration larger than the central cavity, some means had to be provided whereby the slot former could be easily removed without damaging the exposed surface of the slot as well as the central cavity in the grain.

It is an object of the invention, therefore, to provide an apparatus that can be inserted into or withdrawn from the central cavity of a solid propellant grain and manipulated after it has been inserted into the central cavity to produce a slot that extends transversely of the longitudinal axis of the central cavity and communicates therewith.

The apparatus of the instant invention was provided with a flexible cutting shaft that is rigid when an attempt is made to flex it laterally in one direction, yet will flex to a full 90° angle when it is flexed laterally in the opposite direction. After the cutting shaft has been flexed at an angle, it then reassumes its rigidity both fore and aft of the bend; and when a cutter blade or knife is affixed to the inner end of the cutting shaft, the blade or knife will be able to be manipulated to cut a slot in the propellant grain.

There are many advantages that are provided by the use of the instant invention—savings in the cost of manufacture of the rocket motor, the ability to create many variations of geometrical cavity configurations, and the over-all size of the slot created by the apparatus is not controlled by the overall size of the central cavity.

The geometrical configuration of the central cavity can also be changed to meet various requirements for changes in the exposed surface of the cavity. While no such requirement has been made, it would be possible, with the instant invention, to cut a central cavity that would resemble the well-known "Coke" bottle.

The cutting of the slot in the propellant grain with the instant inventon would also result in saving time and manpower that would be required to provide the slot in any other manner.

A further object of the invention, therefore, is to provide an apparatus that would save manhours, expense, as well as material in each motor loading that is provided with a slot cutting operation instead of a slot forming operation.

With the above and other objects and advantages in view, the invention consists of the novel details of construction, arrangement and combination of parts more fully hereinafter described, claimed and illustrated in the accompanying drawings wherein:

Figures 1, 2:
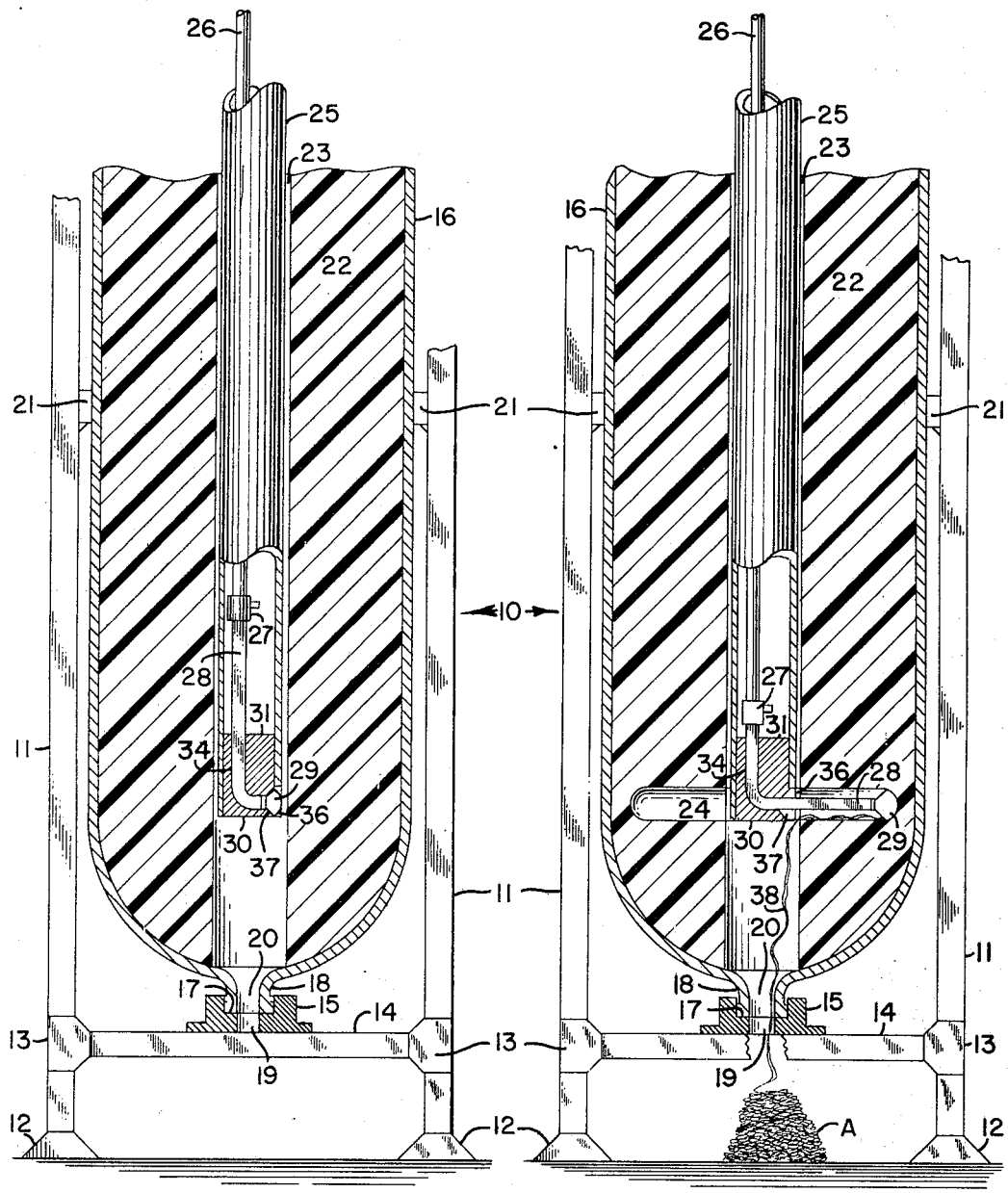
FIGURE 1 is an elevational schematic view, partly in section and partly broken away, showing the manner in which an apparatus including the flexible cutter shaft is inserted into a central cavity of a propellant grain.
FIGURE 2 is a view similar to FIGURE 1 showing the manner in which the slot is cut into the propellant grain.

Referring more in detail to the drawings wherein like parts are designated by like reference numerals, the reference numeral 10 is used to generally designate a portion of the supporting frame that is used to cradle a motor case during the operation of the flexible cutting shaft embodying the invention.

The frame 10 includes a plurality of equally-spaced, vertically-disposed stanchions 11, each of which is provided with an anchoring foot 12. Rigidly secured to each of the stanchions 11 upwardly from the foot 12 is a coupling 13, and a plurality of transversely-extending brace bars 14 are secured at their opposite ends to the couplings 13 on the stanchions 11. The brace bars 14 retain the stanchions 11 in rigid spaced relation to each other and retain thereon a centering plate 15 on which is positioned a rocket motor case 16.

The plate 15 is provided with a seat 17 in which is positioned an igniter adapter 18 for the motor case 16, and the seat 17 is provided with an outlet 19 that extends through the bottom of the plate 15 and is in vertical alignment with an opening 20 in the adapter 18. Each of the stanchions 11 also have secured thereto in spaced relation to each other a plurality of bumpers 21 which cushion the motor case 16 and prevent any undue lateral movement thereof.

The motor case 16 has a propellant grain 22 cast therein in any well-known manner, and the propellant grain 22 is provided with a central cavity 23 which, in the instance shown, is of cylindrical formation.

The mechanism used to control the cutting operation for a slot 24 in the propellant grain 22 comprises an elongated tubular member 25. The tubular member 25 is caused to be inserted into and removed from the central cavity 23 by any well-known raising and lowering mechanism; and rotation of the tubular member 25 may also be caused by any well-known mechanism.

Extending into the tubular member 25 is a rigid shaft 26, and means of any well-known construction may be used to raise and lower the shaft 26 within the confines of the tubular member 25.

The lower end of the shaft 26 is provided with a socket 27 which is connected to a flexible cutter shaft 28, as shown in FIGURES 1 and 2. The end of the shaft 28 opposite to that end that is connected to the socket 27 has a cutting blade or knife 29 rigidly secured thereto and the configuration of the cutting blade or knife 29 is shaped to conform to any shape of configuration or slot that is desired to be cut in the propellant grain 22.

Rigidly secured in the lower end of the tubular member 25 is a sectional cylindrical-shaped guide block 30, and the guide block 30 comprises a right-hand, semi-cylindrical-shaped section 31 and a left-hand, semi-cylindrical-shaped section 32. As can be seen from FIGURES 3 and 5, the shaft 28 is substantially square-shaped in cross-section; and an approximately L-shaped channel 33 is formed in the guide block 30 by means of a half square-shaped sectional channel 34 in the section 31 and a half square-shaped sectional channel 35 in the section 32.

When the guide block 30 is secured in the tubular member 25, it is so positioned that the channel 33 is in direct alignment with an opening 36 in the tubular member 25 through which the blade or knife-receiving end of the shaft 28 will extend to cut the slot 24, as shown in FIGURE 2. The sections 31 and 32 are provided with half-cavities 37 which are positioned in alignment with each other to provide a full cavity into which the blade or knife 29 is retracted when the tubular member 25 is to be inserted into or withdrawn from the cavity 23 in the propellant grain 22, as shown in FIGURE 1.

Figure 6:
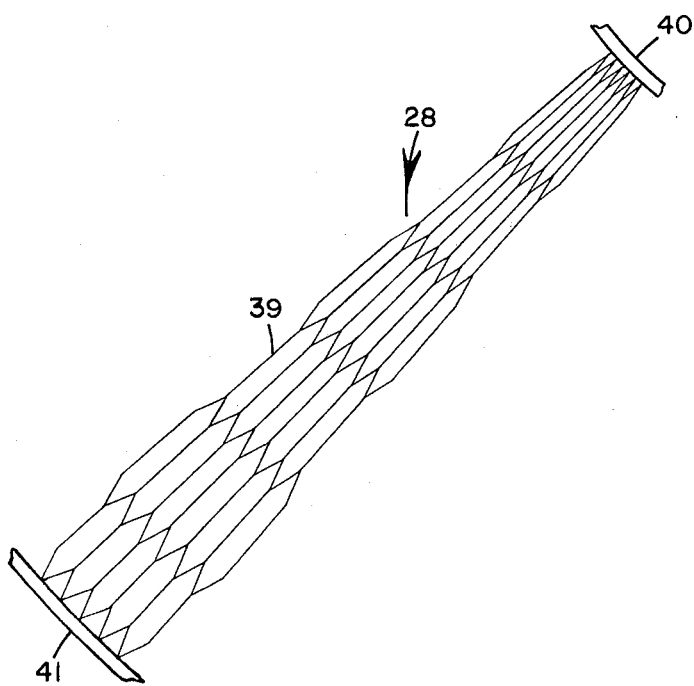
FIGURE 6 is an enlarged fragmentary detailed view of the flexible cutter shaft in the position it would approximately assume on the dotted line 6—6 of FIGURE 4.

Referring more in detail to FIGURE 6 wherein there is disclosed the actual structure of the shaft 28, it is to be noted that this view is approximately four times the actual size of the shaft 28, as it is made for the actual reduction to practice of the invention.

Figure 3:
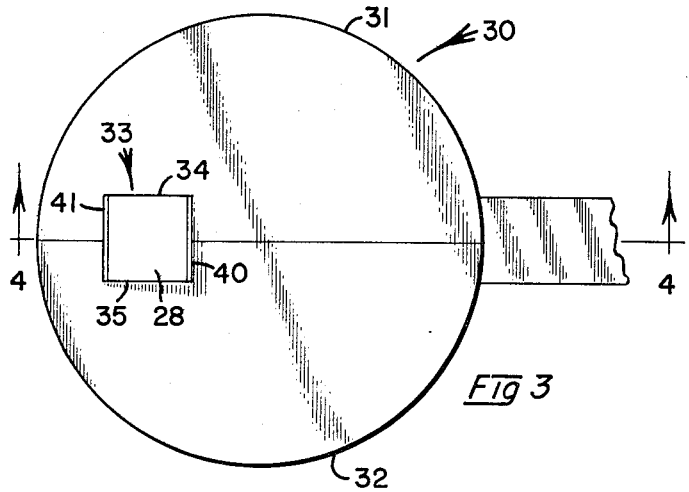
FIGURE 3 is an elevational view, partly broken away, of the upper end of the sectional guide block for the flexible cutter shaft.
Figure 4:
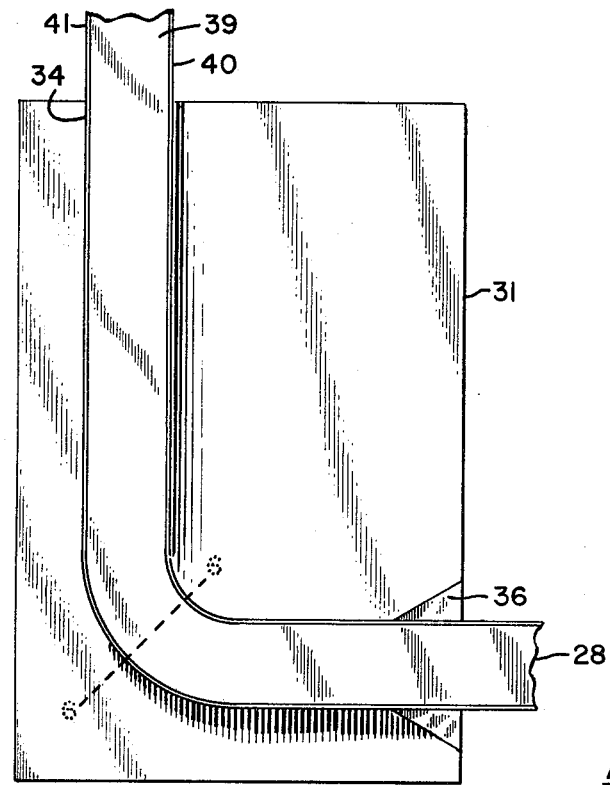
FIGURE 4 is an elevational view, partly broken away, of one secton of the guide block looking in the direction of the arrows on the line 4—4 of FIGURE 5.
Figure 5:
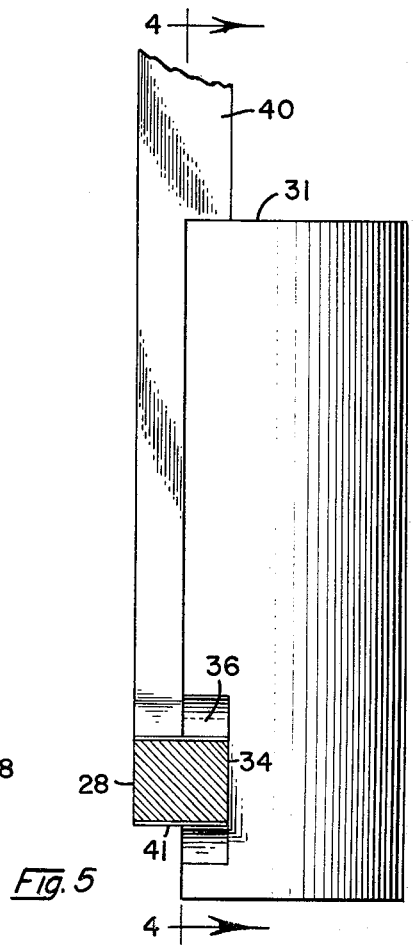
FIGURE 5 is a view of the section of the guide block of FIGURE 4 that has been rotated 90° from the position in FIGURE 4.

The shaft 28 is made from aluminum and is composed of sections 39 that are twice as long as they are wide, and such sections are indicated by the demarkation lines 40, shown on FIGURES 3 to 5 inclusive. Each of the sections 39 is made from a honeycomb structure, as shown at 39 in FIGURE 6. This figure also shows the action of the honeycomb structure as it passes through the channel 33, as on the dotted line 6—6.

In constructing the shaft 28, the sections 39 are placed end to end and placed under compression; and the honeycomb is actually crushed into a solid, yet flexible, shaft. To bond the sections together, a flexible adhesive, such as an epoxy adhesive, is placed between the ends of the sections 39; and after the shaft has been compressed, it is cured at 150° F. for two hours, after which all edges of the flexible shaft 28 are machined to provide smooth surfaces.

A strip of aluminum 40 is bonded to the flexible shaft 28 along the entire length of one edge thereof by the same epoxy adhesive used to bond the sections 39 together, and the flexible shaft 28 is cured under 10 inches of vacuum at 150° F. for another two hours. A second strip 41 is bonded at its opposite ends only to the opposite edges of the flexible shaft 28 by an epoxy adhesive, and these ends are placed under compression and cured at 340° F. for one hour. The strip 41 is sufficiently loose to permit the flexing of the flexible shaft 28 in one direction to approximately a 90° angle, but the strip 40 that is rigidly bonded to the crushed honeycomb sections prevents the flexing of the flexible shaft 28 in the oposite direction. Thus, when the strip 41 has been flexed to its maximum length, the flexible shaft 28 becomes rigid as it leaves the guide block 31. The flexible shaft 28 will, after it has been flexed once, not flex a second time at any portion of its length. The flexible shaft 28 will, however, continue to flex along the approximately line 6—6 when the shaft 28 is raised or lowered to position the blade or knife 29 into cutting position or when it is withdrawn from its cutting position after the slot 24 has been cut into the propellant grain 22.

In FIGURE 6, the honeycomb section 39 is shown before it is placed under compression and before the strips 40 and 41 have been secured thereto. If the honeycomb section had been illustrated after it had been placed under compression, a clear understanding of the flexible shaft 28 would not be obtained. The flexible shaft 28 is inserted at one end into the channel 33 in the guide block 31 and this end is extended outwardly of the guide block 31 until the blade or knife 29 can be secured thereto. The blade or knife is then withdrawn into the cavity formed by the half sections 37 and the tubular member 25 is inserted into the cavity 23 in the propellant grain 22. As the blade or knife 29 cuts the slot 24, the cuttings 38 will pass outwardly of the slot 24; the tubular member 25 and the seat 17 and outlet 19 to be deposited in a refuse pile, as shown at A in FIGURE 2.

It is believed, however, that the foregoing description will clearly set forth the manner of forming the flexible shaft 28 and its use so that one skilled in the art will be familiar therewith; and it is also to be understood that variations in the mode of operation and construction thereof may be adhered to provided such variations fall within the spirit of the invention and the scope of the appended claims.

Having thus described the invention, what is claimed as new and desired to be secured by Letters Patent is:

1. A flexible shaft assembly for use in cutting a slot in a solid propellant grain comprising a shaft having a compressed honeycomb structure, and means for guiding a portion of said shaft from a first plane to a second plane at right angles to said first plane.

2. A flexible shaft assembly as in claim 1, wherein a first strip is secured to one entire edge of said honeycomb structure and a second strip is secured at its opposite ends to that edge that is directly opposite to said one edge.

3. A flexible shaft comprising an elongated compressed honeycomb body portion, a first strip secured to one edge thereof throughout its entire length and a second strip secured at its opposite ends to that edge that is directly opposite to said one edge.

No references cited.

MILTON KAUFMAN, *Primary Examiner.*